United States Patent Office 2,875,399
Patented Feb. 24, 1959

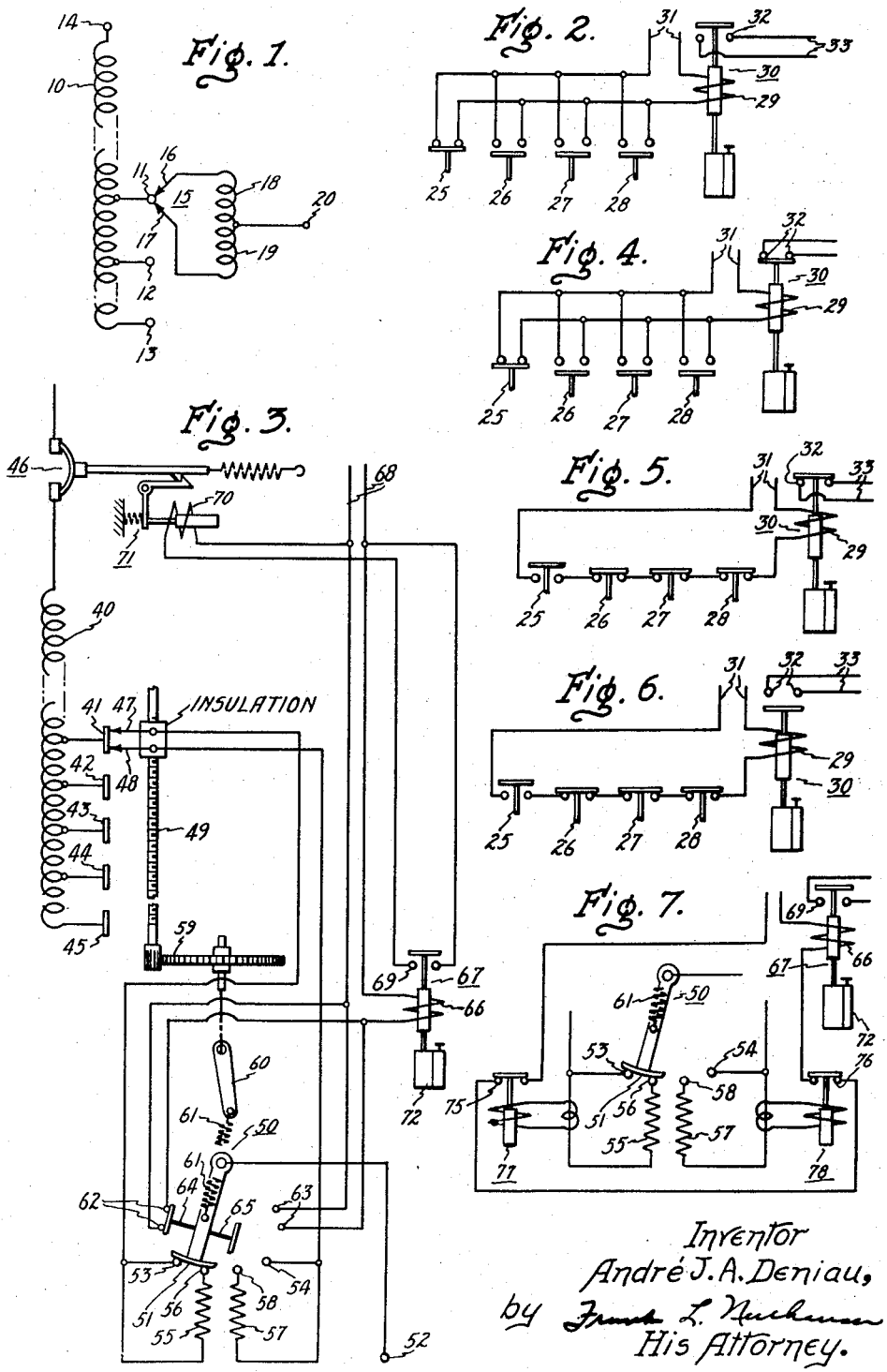

2,875,399

MEANS FOR PROTECTING TRANSITION IMPEDANCES

André J. A. Deniau, Paris, France, assignor to Societe Generale de Constructions Electriques et Mecaniques, Paris, France Application February 28, 1956, Serial No. 568,313

Claims priority, application France March 4, 1955

8 Claims. (Cl. 323—43.5)

This invention relates to regulating transformers and the like of the type wherein voltage ratio changes are effected by a load tap changing arrangement. The invention more particularly relates to means for protecting transition impedances employed to prevent the interruption of current in load tap changing devices.

The problem of tap changing under load presents special difficulties since the interruption of load current during a tap changing operation must be avoided. In the past, therefore, it has been common to employ transition impedances which are inserted in the circuit of the tap changing device temporarily during the change of taps.

In a typical arrangement of this type, a regulating transformer is provided having a winding with a plurality of taps. A tap switching device is provided having a pair of contact fingers adapted for contacting the taps of the winding. The contact fingers are each serially connected with a transition impedance, and means are provided for connecting the other ends of the transition impedances to a utilization circuit or source of electric power, as the case may be, during a tap changing operation.

During normal operation the two contact fingers contact the same tap on the winding, and the contact fingers may be connected directly to the load circuit or source of power. In a tap changing operation one of the contact fingers is moved into contacting relationship with an adjacent tap, and simultaneously the transition impedances are serially connected between the two taps to limit the flow of circulating current flowing between the two taps. The moving of the first contact finger is followed by the rapid switching of the load or power circuit from direct contact with the unmoved contact finger to the junction between the transition impedances and thence to direct connection with the first contact finger. Then the second contact finger is moved to the second tap.

The transition impedances may be dimensioned for a very short operating time, such as the minimum time during which they are required to carry the circulating current to properly effect the tap change. When the impedances are so designed, very heavy overloads are permissible (e. g. current densities are 50 to 100 amperes per square millimeter).

Designing of the impedances for short operating time gives rise to the advantage that the impedances are then less costly and do not take up much room. On the other hand, this arrangement has the disadvantage that damage may occur if the transition impedances remain in operation between the two taps longer than they should due to mechanical failure of the tap changing device.

It is therefore an object of this invention to provide a means for protecting transition impedances against the risks they may be exposed to when they are accidentally traversed for an abnormally long time by local circulating currents.

A further object of this invention is to provide means for removing power from electric load regulating apparatus in the event of impending damage to transition impedances of tap changing devices.

A further object of this invention is to provide means for de-energizing regulating transformer systems of the load tap changing type in order to prevent damage to transition impedances as a result of failure of the tap changing devices.

Briefly stated, in accordance with one embodiment of my invention, the means of protection of the transition impedances is essentially characterized by the fact that when the load tap changing switch is in an intermediate position (where the contact fingers are on adjacent tap positions and circulating current traverses the transition impedances), it acts upon a time delay device to actuate a circuit breaker or other protective device if the switch is not actually brought to its new end position corresponding to the placing of the new tap in service within the allowable time for the impedance to remain in the transition position. The circuit breaker may be connected by any conventional means to remove electrical power from the transition impedances, such as by de-energizing the system.

While the specification concludes with claims particularly putting out and distinctly claiming the subject matter which I regard as my invention, it is believed that the invention will be better understood from the following description taken in connection with the accompanying drawings in which:

Fig. 1 is a circuit diagram conventional load tap changing arrangement;

Fig. 2 is a circuit diagram of one embodiment of the protective circuit of my invention;

Fig. 3 is a circuit diagram of one embodiment of my invention in combination with a load tap changing device;

Figs. 4, 5, and 6 are circuit diagrams of modifications of the circuit of Fig. 2; and Fig. 7 is a circuit diagram of a portion of the circuit of Fig. 3 illustrating another embodiment of my invention.

Referring now to the drawings, and more in particular to Fig. 1, therein is shown a winding 10 having a plurality of taps, such as the taps 11 and 12 and end tap 13. The winding 10 may be the regulating winding of a regulating transformer. The end terminal 14 of the winding 10 is connected to an electric circuit (not shown) in a conventional manner. A switch 15 having two contact fingers 16 and 17 is arranged so that the contact fingers 16 and 17 can make contact sequentially with adjacent taps on the winding 10. The contact fingers 16 and 17 are serially connected by way of transition impedances 18 and 19 respectively in the conventional manner to a terminal 20.

In any given tap position, both of the contact fingers 16 and 17 contact the same tap; thus in Fig. 1 both of the fingers 16 and 17 contact the tap 11. To shift to the next tap position, such as tap 12, the contact finger 17 is first moved to the tap 12. In this intermediate position the part of the winding 10 between the taps 11 and 12 produces circulating currents that traverse the impedances 18 and 19 in series. Then the other finger 16 in turn leaves the tap 11 and makes contact with the tap 12. In the full tap position, such as when both of the contact fingers contact the same tap, there is no local circulating current through the transition impedances 18 and 19.

The circuit of Fig. 2 is an initial example of the protective device in conformity with my invention. In this arrangement I utilize the plurality of contacts, such as contacts 25, 26, 27, and 28, which are connected in parallel. The parallel connected contacts are connected in series with the coil 29 of a relay 30, and a source of electrical power 31. Each of the parallel connected contacts of the circuit of Fig. 2 corresponds to a tap position, such as the tap positions 11, 12, and 13 of the winding 10 in Fig. 1. Appropriate mechanical coupling means are provided so that one of the parallel connected contacts will be closed when the contact fingers contact the corresponding tap of the tap winding. At all other times, that is during the transition period when a tap is being changed, all of the parallel connected contacts will remain open. For example, the parallel connected taps may be mechanically coupled to the load tap changing switch 15 such that when contact fingers 16 and 17 contact tap 11, contact 25 will be closed. When contact finger 17 is removed from the tap 11, the mechanical coupling effects the opening of contact 25. Then all of the parallel connected contacts will remain open until both of the contact fingers 16 and 17 have come in contact with another tap, such as tap 12, in which event the corresponding parallel connected contact will close.

The contacts 32 of relay 30 are connected to a circuit breaker (not shown) by means of leads 33. The circuit breaker may be located in any conventional manner such as in series with winding 10. The opening of the circuit breaker that protects the transition impedances by means of removal of current therefrom is effected by the closing of the contacts 32 of leads 33. The relay 30 is of the time delay type. The circuit of Fig. 2 is arranged such that when relay coil 29 is energized, the contacts of the relay are kept open. The delay time $\Delta t_1$ of the relay is designed to be greater than the time $\Delta t_2$ during which the transition impedances such as 18 and 19 of Fig. 1 are normally in their transition position (i. e. when the contact fingers such as in Fig. 1 are on adjacent taps and circulating current therefore flows through the transition impedances).

Referring now to Figs. 1 and 2, and assuming a mechanical coupling in the manner before stated between the parallel connected switches of Fig. 2 and the tap changing switch of Fig. 1, a typical operation cycle of my invention is as follows. When the contact fingers 16 and 17 are in the position shown in Fig. 1, with tap 11 in service, the contact 25 of Fig. 2, controlled by the end position of the fingers 16 and 17, is closed, the relay 30 is energized, and the protective circuit of leads 33 is opened. In the transition period, finger 17 leaves tap 11 to make contact with tap 12, thereby opening contact 25. At this time relay 30 is no longer energized, but contact 32 of the time delay relay remains open for the delay time $\Delta t_2$. Lastly, finger 16 in turn leaves tap 11, terminating the transition period, and makes contact with tap 12, thereby closing contact 26 in its end position. At this time the relay 30 is re-energized.

If the operation of the switch 15 was normal, the transition time $\Delta t_1$ is shorter than the time $\Delta t_2$ by which the closure of contacts 32 of relay 30 is delayed. In this case the protective circuit has remained open. If the operation was faulty, however, the duration of the transient period $\Delta t_1$ is greater than the delay time $\Delta t_2$ of closure of contacts 32. In this event the protective circuit is closed by way of contacts 32, thereby resulting in the opening of the transformer safety circuit breaker.

Referring now to Fig. 3, therein is illustrated the typical example of the manner in which the contact terminals of the time delay relay may be controlled by the tap changing switch. In this example, a regulating winding 40 having a plurality of taps, such as taps 41, 42, 43, and 44 and an end tap 45, is connected in series with a circuit breaker 46. A pair of contact fingers 47 and 48 are arranged on a threaded shaft 49 for sequentially contacting the taps upon rotation of the shaft. A rapid operation switching device 50, such as a Jansen switch, is provided having a rotating conductor bridge 51 connected to a terminal 52. The end positional terminal blocks 53 and 54 of the switch 50 are connected respectively to the fingers 47 and 48 of the tap selector. A transition impedance 55 is connected between the end position terminal block 53 and the intermediate position terminal block 56. Similarly, a transition impedance 57 is connected between end position terminal block 54 and intermediate position terminal block 58.

The arm of the switch 50 is coupled to the threaded rod 49 by means of a gear train 59 driven by the rod 49, and arm 60 driven by the gear train, and a spring 61 connected between the end of the arm 60 and the arm 51 of switch 50. The mechanical coupling effects the rapid movement of the conductor switch from the end position, as shown in Fig. 3, where the terminal blocks 53 and 56 are bridged, to the other end position where the terminal blocks 54 and 58 are bridged. In the position of the conducting bridge as shown in Fig. 3, the transition impedance 55 is shunted. In the intermediate position of the switch 50, the terminal blocks 56 and 58 are bridged, thereby placing the two transition impedances in series between a pair of adjacent taps of winding 40. In the other end position of the switch, the transition impedance 57 is shunted. The arrangement shown in Fig. 3 for the operation of the tap selector in switch 50 is merely exemplary, and it is obvious to one skilled in the art that many other arrangements may be provided to serve the same function.

The switch 50 is also provided with auxiliary contacts 62 and 63 which are arranged such that the contacts 62 are bridged when the switch 50 is in one end position by means of an insulated extension arm 64 of the arm of switch 50, and the contacts 63 are bridged in the other end position of switch 50 by means of another insulated extension 65 on the arm of the switch 50.

The contacts 62 and 63 are connected in parallel, the parallel combination being connected in series with the coil 66 of time delay relay 67, and a source of electrical power 68. The contacts 69 of the relay 67 are connected in a series with a coil 70 of a release mechanism 71 of the circuit breaker 46 and the source of power 68. As shown in Fig. 3, the contacts 69 of the relay 67 are open when the coil 66 is energized. This relay is provided with conventional means such as a dashpot 72 for delayed closing of the contact 69.

As shown in Fig. 3, both of the contact fingers 47 and 48 contact the tap 41, and the tap 41 is connected to the terminal 52 by way of the arm of switch 50, terminal block 53, and contact finger 47. At this time the contacts 62 are bridged, thereby energizing the coil 66 of relay 67, and as a result the contacts of the relay 67 are open and the coil 70 of the circuit breaker release mechanism 71 is de-energized.

If it is now desired to place tap 42 in service, rotation of the threaded shaft 49 effects the downward movement of the contact fingers and thereby the separation of the finger 48 with the tap 41 and its reconnection with tap 42. The rapid acting switch 50 first places the impedance 55 in series between the tap 41 and the electrical circuit 52 by means of removal of the contact bridge from contact with end terminal block 53, then serially connects the impedances 55 and 57 between the taps 42 and 41 with the electrical circuit 52 being connected to the midpoint of the impedance means, then removes the impedance 55 from the circuit so that the electrical circuit 52 is connected only to tap 42 by way of impedance 57, and finally bridges the terminal blocks 54 and 58 to shunt the impedance 57 and connect the electrical circuit 52 directly to tap 42.

Upon the initial movement of the arm of the switch 50, the arm 64 breaks the contact between the contacts 62, thereby de-energizing the coil 66 of relay 67. Since the relay 67 is of the time delay type, the contacts 69 are not immediately closed. Upon the reaching of the other end position on the switch 50, the arm 65 establishes contact between contacts 63, thereby re-energizing the coil of relay 67.

If the tap changing operation was normal, $\Delta t_1$ the transition time is shorter than $\Delta t_2$, the time delay in the closing of the contacts of relay 67. In this event the coil in the relay 67 is re-energized before the contacts 69 have closed, and therefore the circuit breaker 46 has not opened.

If the operation is faulty, $\Delta t_1$ is longer than $\Delta t_2$, contacts 69 of relay 67 are closed to energize the coils 70 of circuit breaker 71, and the circuit breaker 46 is opened to remove electrical power from the system.

Thus, if transition time exceeds the duration intended, the incident is confined to the replacement of the defective mechanical part, and in no event are the transition impedances destroyed for they cannot be kept on the line for any time that exceeds the limit $\Delta t_2$ for which they are dimensioned.

Figs. 4, 5, and 6 represent variations of the control of the circuit of Fig. 2. In Fig. 4 the leads are assumed to be connected to a low voltage circuit breaker, with contacts 32 being normally closed and opening only if all of the parallel connected contacts 25, 26, 27, and 28 remain open during the time $\Delta t_2$ that corresponds to the delay in the opening of the contact 32. It is obvious, of course, that the parallel connected contacts 25, 26, 27, and 28 can be designed as a combination of the two contacts 62 and 63 of Fig. 3.

In Figs. 5 and 6, the contacts 25, 26, 27, and 28 are connected serially with the coil 29, the coil not being energized in normal operation. The contacts 32 in Fig. 5 are normally closed, functioning to release a safety no-voltage circuit breaker. In Fig. 6, on the other hand, the contacts 32 are normally open for use in the manner illustrated in the Figs. 2 and 3.

In Fig. 7, which illustrates a modification of a portion of the circuit of Fig. 3, the coil 66 of the time delay relay is energized by means of the series connected contacts 75 and 76 of relays 77 and 78 respectively. The coil of the relay 77 is inductively coupled to a lead in series with the transition impedance 55, and the coil of the relay 78 is inductively coupled to a lead in series with the transition impedance 57. In this modification, the contacts 75 and 76 are both closed except in the event when their coils are energized due to flow of current through the transitional impedances during a transitional period. Other modifications of this arrangement are obvious, such as illustrated in Figs. 5 and 6.

It will be understood, of course, that while the forms of the invention herein shown and described constitute preferred embodiments of my invention, it is not intended herein to illustrate all of the possible equivalent forms or modifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of my invention.

What I claim as new and desire to secure by Letters Patent of the United States is:

1. Means for protecting transition impedances of a load tap changing system comprising a load tap changing switch having a pair of contact fingers adapted for sequentially contacting adjacent taps of an electrical winding having a plurality of taps, an electric circuit, said switch being arranged for normal operation when said electric circuit is connected to one said tap by way of at least one of said fingers and having occasional transitional tap changing periods during which said electric circuit is connected to the next adjacent tap, transition impedance means, said switch means being arranged to connect said impedance means between said contact fingers at least during said transitional periods, a plurality of parallel connected contacts, time delay means connected to said plurality of contacts, means coupling said tap changing switch to said plurality of contacts such that said time delay means is actuated during said transitional period, and circuit breaker means connected to said time delay means.

2. Means for protecting transition impedances of a load tap changing system comprising a load tap changing switch having a pair of contact fingers adapted for sequentially contacting adjacent taps of an electrical winding having a plurality of taps, an electric circuit, said switch being arranged for normal operation with said electric circuit being connected to one of said taps by way of at least one of said fingers and having transitional tap changing periods during which said electric circuit is connected to the next adjacent tap, transition impedance means, said switch being arranged to connect said impedance means between said contact fingers at least during said transitional period, a plurality of parallel connected contacts, time delay means connected to said plurality of contacts, means coupling said tap changing switch to said plurality of contacts such that said time delay means is actuated during said transitional period, and circuit breaker means connected to said time delay means to remove power from said transition impedance means when said time delay means has been actuated for a predetermined period of time.

3. In a load tap changing system of the type having a tap changing switch with two contact fingers adapted to sequentially contact the taps of an electrical winding, the switch being arranged for normal operation with an electric circuit connected to one of said taps by way of at least one of said fingers and having occasional transitional tap changing periods during which said electric circuit is connected to the next adjacent tap, and transitional impedance means connected to said contact fingers in such a manner that said impedance means is connected between adjacent taps of said winding at least during said transitional period, means for protecting said transitional impedance from damage in the event of extension of said transitional period beyond a predetermined time comprising a plurality of parallel connected contact means mechanically coupled to said tap changing switch, said parallel connected contact means being connected to a time delay means, circuit breaking means operable by said time delay means and connected to remove electrical power from said transition impedance means, said contact means being arranged to actuate said time delay means during said transitional period so that said circuit breaker means acts to remove electrical power from said transition impedance means after said time delay means has been actuated for said predetermined time.

4. Means for protecting transition impedances of a load tap changing system comprising a load tap changing switch having a pair of contact fingers adapted for sequentially contacting adjacent taps of an electrical winding having a plurality of taps, said switch being arranged for normal operation with an electric circuit being connected to one of said taps by way of at least one of said fingers and having transitional tap changing periods during which said electric circuit is connected to the next adjacent tap, transition impedance means, said switch being arranged to connect said impedance means between said contact fingers at least during said transitional periods, time delay means, means coupling said time delay means to said tap changing switch such that said time delay means is actuated during said transitional period, and circuit breaker means connected to said time delay means to remove power from said transition impedance means when said time delay means has been actuated for a predetermined time.

5. A tap changing system for electrical apparatus comprising a tap changing switch having a pair of contact fingers connected to sequentially contact the taps of an electrical winding, said switch being arranged for normal operation with an electric circuit being connected to one of said taps by way of at least one of said fingers and having an occasional transitional tap changing period during which said electric circuit is connected to the next adjacent of said taps, transition impedance means, said switch means being arranged to connect said transition impedance means between said contact fingers and said electric circuit at least during a portion of said transitional period, time delay means, said time delay means being arranged to be actuated during said transitional period, and circuit breaker means connected to and operable by said time delay means to remove electrical power from said transition impedance means after said time delay means has been actuated for a predetermined period of time.

6. A tap changing system for electrical apparatus comprising a tap changing switch having a pair of contact fingers adapted to sequentially contact the taps of an electrical winding, said switch being arranged for normal operation with an electric circuit connected to one of said taps by way of at least one of said fingers and having an occasional transitional tap changing period during which said electric circuit is connected to the next adjacent of said taps, transition impedance means, rapid acting switch means connected to said contact fingers and said impedance means serially connecting said transition impedance means between said electric circuit and said fingers at least during a portion of said transition period, time delay means, said time delay means being arranged to be actuated during said transitional period, and circuit breaker means connected to and operable by said time delay means to remove electrical power from said transition impedance means after said time delay means has been actuated for a predetermined period of time.

7. A tap changing system for an electrical apparatus comprising a tap changing switch having a pair of contact fingers adapted to sequentially contact the taps of an electrical winding, said switch being arranged for normal operation with an electric circuit being connected to one of said taps by way of at least one of said fingers and having an occasional transitional tap changing period during which said electric circuit is connected to the next adjacent of said taps, transition impedance means, rapid acting switch means connected to said contact fingers in said impedance means and serially connecting said impedance means between said electric circuit and said fingers at least during a portion of said transition period, time delay means, switch means mechanically coupled to said rapid acting switch means and connected to actuate said time delay means during said transitional period, and circuit breaker means connected to and operable by said time delay means to remove electrical power from said transition impedance means after said time delay means has been actuated for a predetermined period of time.

8. A tap changing system for electrical apparatus comprising a load tap changing switch having a pair of contact fingers connected to sequentially contact the taps of an electrical winding, said switch being arranged for normal operation with an electric circuit connected to one of said taps by way of at least one of said fingers and having an occasional transitional tap changing period during which said electric circuit is connected to the next adjacent of said taps, transition impedance means, rapid acting switch means connected to said contact fingers in said impedance means and serially connecting said transition impedance means between said electric circuit and said fingers at least during a portion of said transition period, said rapid acting switch means having two end positions corresponding to adjacent positions of said tap changing switch, time delay means, a pair of contact means connected to said time delay means and arranged on said rapid acting switch means to effect the actuation of said time delay means when said rapid acting switch means is off of its end positions, and circuit breaker means connected to and operable by said time delay means to remove electrical power from said transitional impedance means after said time delay means has been actuated for a predetermined period of time.

No references cited.